(12) United States Patent
Kim et al.

(10) Patent No.: US 12,405,963 B1
(45) Date of Patent: Sep. 2, 2025

(54) ROUTING CHILD TASKS OF COMPUTATIONAL JOBS TO CELLS OF A NETWORK-BASED SERVICE

(71) Applicant: Amazon Technologies, Inc., Seattle, WA (US)

(72) Inventors: Dajung Kim, Sunnyvale, CA (US); Linchi Zhang, Sunnyvale, CA (US); Santosh Chandrachood, Saratoga, CA (US); Pratik Bhagwat Gawande, Sunnyvale, CA (US); Nitin Bahadur, Santa Clara, CA (US); Harish Sitaraman, San Ramon, CA (US); Sampath Shreekantha, Santa Clara, CA (US); Chang Woo Lee, Hoboken, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 18/424,264

(22) Filed: Jan. 26, 2024

(51) Int. Cl.
*G06F 16/25* (2019.01)
*G06F 21/62* (2013.01)

(52) U.S. Cl.
CPC ........ *G06F 16/254* (2019.01); *G06F 21/6218* (2013.01)

(58) Field of Classification Search
CPC ............................ G06F 16/25; G06F 21/6218
See application file for complete search history.

(56) References Cited

U.S. PATENT DOCUMENTS

| | | | |
|---|---|---|---|
| 10,915,544 B2 * | 2/2021 | Greene | G06F 16/254 |
| 11,310,155 B1 | 4/2022 | Qian et al. | |
| 2023/0185804 A1 * | 6/2023 | Jakschitsch | G06F 16/2455 707/718 |
| 2023/0318911 A1 | 10/2023 | Hendrey et al. | |
| 2023/0318935 A1 | 10/2023 | Sergeev et al. | |
| 2025/0086173 A1 * | 3/2025 | Bodziony | G06F 16/24535 |

\* cited by examiner

*Primary Examiner* — Maher N Algibhah
(74) *Attorney, Agent, or Firm* — S. Scott Foster; Kowert, Hood, Munyon, Rankin & Goetzel, P.C.

(57) ABSTRACT

Child tasks of computational jobs are routed to cells of a network-based service. A request received at a request router to perform a child task of a computational job may be received. The request router may parse the request to extract a cell identifier for the run of the computational job. The cell identifier may then be used to identify the cell out of multiple cells implementing the network-based service. The cell identifier may be provided by the cell as part of performing a parent task of the run of the computational job. Then, the request may be sent to the identified cell to perform the child task of the run of the computational job.

20 Claims, 10 Drawing Sheets

Receive, at a request router for a network-based service, a request to perform a child task of a computational job, the computational job including a parent task and one or more child tasks to complete a run of the computational job
810

Parse, by the request router, the request to extract a cell identifier for the run of the computational job included in the request, the network-based service implementing multiple cells as part of a cell-based architecture for the network-based service to execute runs of computational jobs at the network-based service, the cells respectively including computing resources that implement independent replicas of the network-based service to perform tasks sent by the request router that are also isolated from communicating with other ones of the cells, and the cell identifier having been previously provided as part performing of the parent task by a cell of the network-based service assigned the run of the computational job
820

Identify the cell of the network-based services according to a mapping between the cell and the cell identifier, the cells being mapped to different cell identifiers
830

Send the request to the identified cell to perform the child task of the run of the computational job
840

FIG. 8

ROUTING CHILD TASKS OF COMPUTATIONAL JOBS TO CELLS OF A NETWORK-BASED SERVICE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by extracting, transforming, and loading data into different data storage or analysis systems or performing other computational jobs.

BRIEF DESCRIPTION OF THE DRAWINGS

FIG. 8 is a high-level flowchart illustrating various methods and techniques to implement routing child tasks of computational jobs to cells of a network-based service, according to some embodiments.

Figure 1:
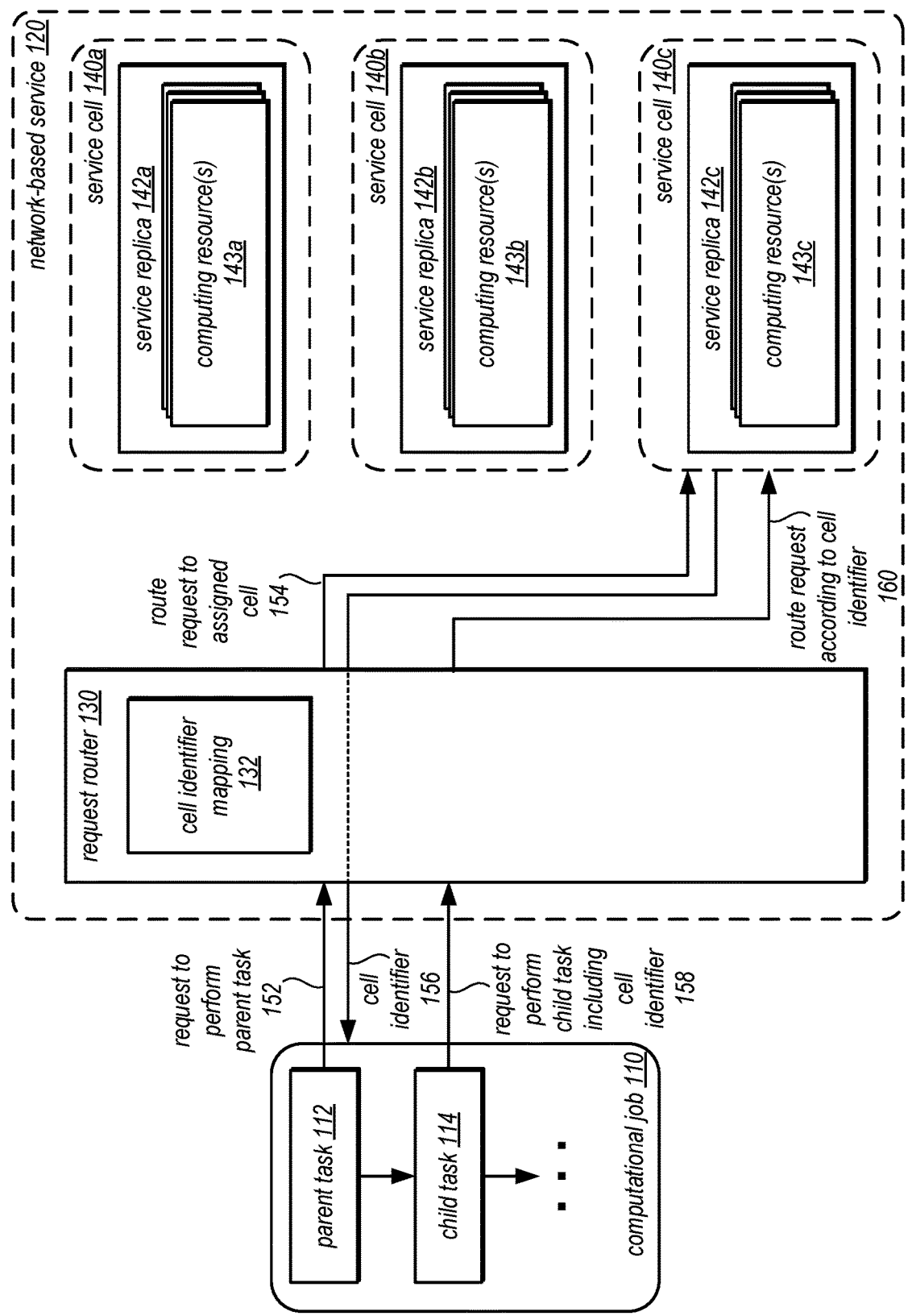
FIG. 1 illustrates a logical block diagram of routing child tasks of computational jobs to cells of a network-based service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Cell-based architectures provide numerous performance benefits for increasing availability and scalability of network-based services. Each cell of a service implemented using a cell-based architecture may provide an independent replica of the service. In this way, computing resources can be scaled within a cell in order to ensure that utilization of computing resources is right-sized to the workload of the cell. Moreover, cells can be implemented using independent infrastructure (e.g., network, power, computational resources), so that each cell may operate independent of other cells.

In spite of these performance benefits, cell-based architectures may offer technical challenges to some types of workloads. For example, some uses of a network-based service may include computational jobs that perform a number of related tasks, starting with a parent task and performing one or more child tasks. These related tasks in the computational job may be a single performance or "run" of the computational job, which may be both ephemeral work (e.g., a specific run of the computational job is only performed once) and "stateful", which has state (e.g., data) that may need to be maintained between tasks of the run in order to complete the run. Different runs of a computational job can be performed on different cells because they are ephemeral work, but tasks within a computational job may need to leverage state of a prior task in the computational job. Accordingly, to take advantage of performance benefits offered by a cell-based architecture, lightweight techniques to route requests, such as child tasks, that use state of a specific run of a computational job may be desirable. In this way, a network-based service can still take advantage of the performance benefits offered by a cell-based architecture without introducing further latency or complicated synchronization schemes that would "violate" the tenants of a cell-based architecture, that each cell should be able to operate independently of the other (e.g., not need state from another cell in order to perform a request).

As discussed in detail below, techniques for routing child tasks of computational jobs to cells of a network-based service may provide such lightweight routing techniques. As one of ordinary skill in the art may appreciate, extending the use of a cell-based architecture to scenarios that would otherwise have to implement complex routing or data synchronization techniques that violate cell-based architectures may improve the performance of network-based services and other computer-related technologies.

FIG. 1 illustrates a logical block diagram of routing child tasks of computational jobs to cells of a network-based service, according to some embodiments. Computational job 110 may perform various data processing operations, including reading or otherwise obtaining data, aggregating, analyzing, modifying, calculating, or otherwise interacting with the obtained data, and storing the data may be performed for a variety of use cases, such as Extract Transform and Load (ETL) jobs, machine learning jobs, data pipeline processing and/or data stream processing jobs, among others. Computational job 110 may include at last one parent task 112, which may be an initial task to set up the performance of later child tasks, including child task 114 (and possibly further child tasks). In various embodiments, the output of one task may be the input to or predicate for another child task (although some child tasks may be tasks that can be performed in parallel sharing a common predecessor task, in some scenarios).

Network-based service 120 may be implemented using a collection of computing resources (e.g., system 1000 in FIG. 10) that can perform computational job 110 in response to one or more requests. Network-based service 120 may, for example, be an ETL service, like ETL service 210, or perform various other types of computational jobs (which may not be ETL jobs). Network-based service may implement respective service cells, such as service cells 140*a*, 140*b*, and 140*c*. Each service cell 140 may be an independent service replica (e.g., service replica 142*a*, 142*b*, and 142*c*), using respective computing resources (e.g., computing resources 143*a*, 143*b*, and 143*c*) which may independently provide replicas of the service that do not rely upon other replicas of the service to perform requests. Moreover, service cells 140 may isolated from communicating with one another (e.g., service cell 140*a* cannot communicate over a network with service 140*b* or 140*c*). Such isolation may be virtually enforced (e.g., via network rules or other network traffic controls or through replica implemented controls, such as service replica 142*a* may not implement code that communicates with other service replicas 142*b* and 142*c*).

Network-based service 120 may implement request router 130 in order to direct requests to service cells 140. Request router 130 may implement various techniques to initially assign a run of a computational job 110 to a service cell such that subsequent requests (e.g., tasks) associated with that same run of the computational job 110 are directed to the same service cell without requiring request router 130 to store the assignment. For example, when request to perform a parent task 152 is sent to request router 130, request router 130 may apply various cell selection techniques, as discussed in detail below with regard to FIGS. 8 and 9, that select a cell (e.g., service cell 140*c*) and then route the request to the assigned cell, as indicated at 154.

Each service cell 140 may be responsible for including a cell identifier for that cell included in responses back, which can be used to subsequently access requests to the same service cell. For instance, service cell 140*c* may include a cell identifier 156 as part of a response to a client that is performing computational job 110. In this way, a request to perform child task 114 can include the cell identifier 158. Then, request router 130 may be able to route the request to service cell 140*c* according to the cell identifier, as indicated at 160, as discussed in detail below with regard to FIG. 8.

Please note that the previous description of routing child tasks of computational jobs to cells of a network-based service is a logical illustration and thus is not to be construed as limiting as to the type of network-based service.

This specification continues with a general description of a provider network that implements an extract, transform, load (ETL) service that identifies, transforms, and moves data stored in the provider network or in external data stores. Then various examples of the ETL service including different components/modules, or arrangements of components/module that may be employed as part of implementing the ETL service are discussed that implement routing child tasks of computational jobs to cells of a network-based service. A number of different methods and techniques to implement routing child tasks of computational jobs to cells of a network-based service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
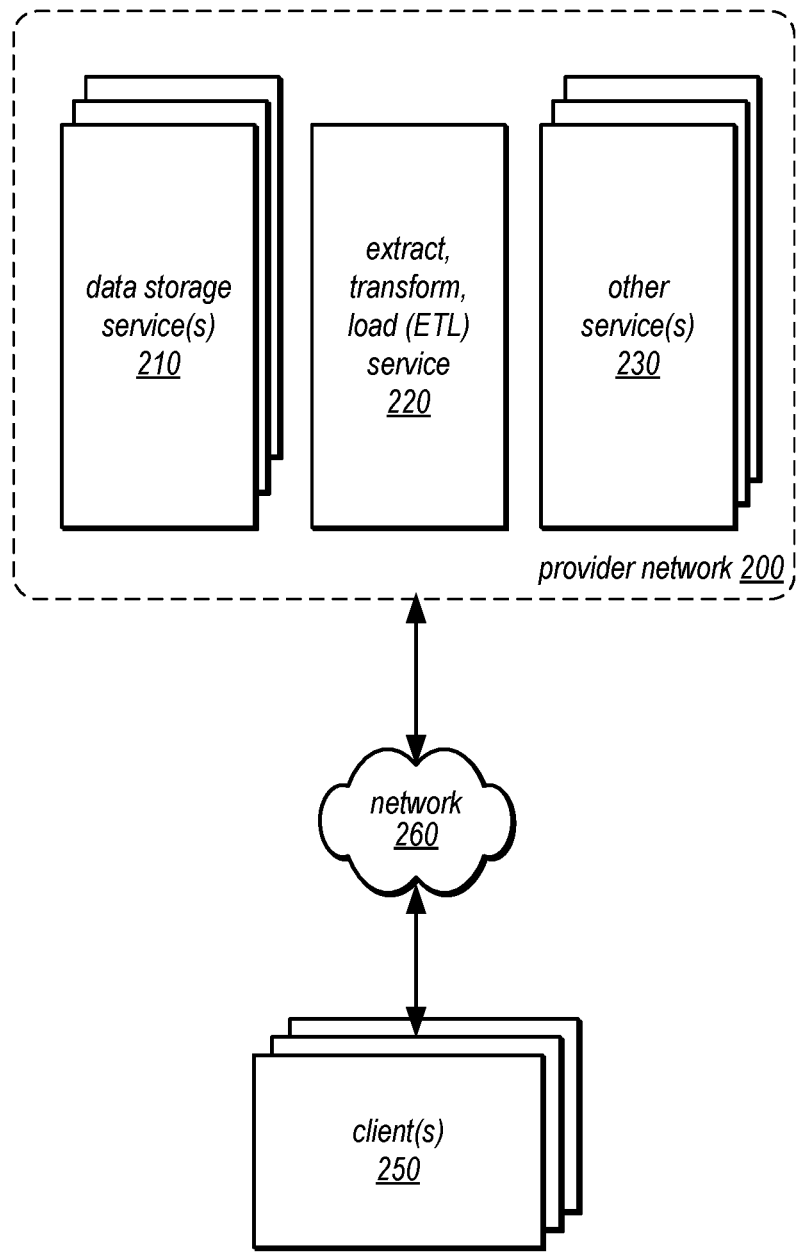
FIG. 2 is a logical block diagram illustrating a provider network offering different services including an extract, transform, load (ETL) service, according to some embodiments.

FIG. 2 is a logical block diagram illustrating a provider network offering different services including an extract, transform, load (ETL) service, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 300 may deliver content from points of presence outside of, but networked with, these regions by way of edge locations and regional edge cache servers. This compartmentalization and geographic distribution of computing hardware enables the provider network 300 to provide low-latency resource access to customers on a global scale with a high degree of fault tolerance and stability.

Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, ETL service 220 may provide clients with the resources to create, maintain, and orchestrate data loading jobs that take one or more data sets, perform various transformation operations, and store the transformed data for further processing (e.g., by one or more of data processing service(s)). ETL service 220 may access a data catalog generated by ETL service 220 in order to perform an ETL operation (e.g., a job to convert a data object from one file type into one or more other data objects of a different file type).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture. Although clients 250 are illustrated as external to provider network 200, in some embodiments clients of different services, like ETL service 220, can be implemented within provider network 200 (e.g., implemented on a resource of other service(s) 230, such as virtual compute instance).

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
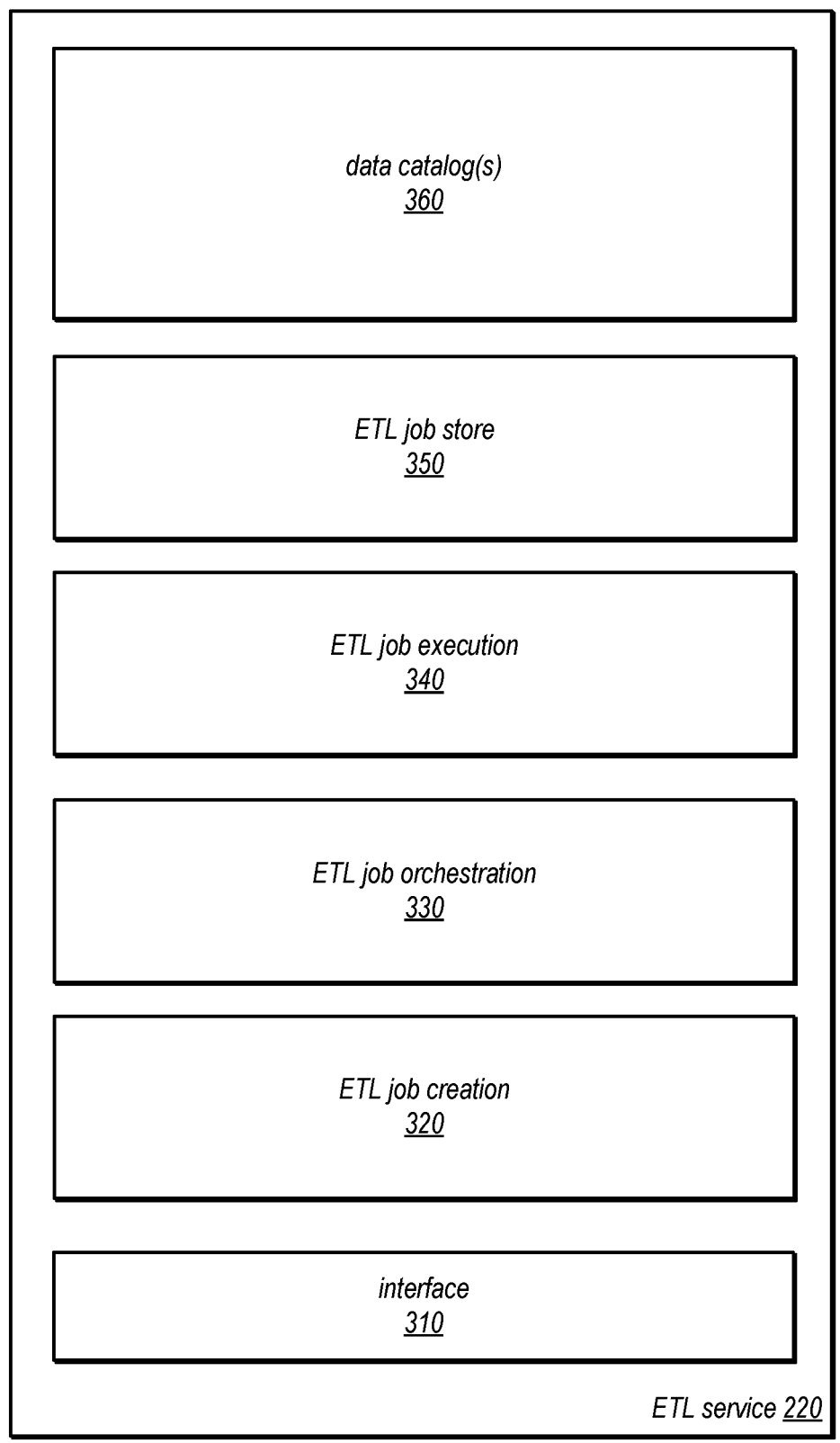
FIG. 3 is a logical block diagram illustrating an ETL service that routing child tasks of computational jobs to cells of a job execution service of the ETL service, according to some embodiments.

FIG. 3 is a logical block diagram illustrating an ETL service that routing child tasks of computational jobs to cells of a job execution service of the ETL service, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation. ETL job creation 320 may handle requests for automated ETL job creation and manual ETL job creation. For example, ETL job creation 320 may receive job generation request which may specify the data object and target data format for the ETL job. Other job information, such as access credentials, triggering events, or any other information to execute the ETL job may be included as part of the creation request or as part of a trigger event registration request. ETL job creation 320 may automatically generate ETL code to perform an ETL job by determining the source data format of the data object and the target data format of the data object. For example, in one embodiment, the source and target data formats from data catalog 360. In another embodiment, data format identification may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for selected transformations and construct the source code for executing the selected transformations. The code for the ETL job may be stored in ETL job store 350 for subsequent execution.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350.

ETL service 220 may implement ETL job management 330 to provide clients with the ability to manage, edit, delete, or otherwise change ETL jobs. Trigger events, may also be defined for ETL jobs (as discussed below with regard to FIG. 6). ETL job management 330 may monitor for trigger events and request execution of ETL jobs.

ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute automatically generated ETL jobs that were modified. ETL job execution 340 may execute jobs in response to detected triggering events for ETL jobs (which may be detected by ETL job management or another system or service monitoring for triggering event conditions), as discussed below with regard to FIG. 7.

ETL service 220 may maintain data catalogs 360 that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog). ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) 360 may be implemented by one or more storage nodes, services, or computing devices (e.g., system 1000 discussed below with regard to FIG. 10) to provide persistent storage for data catalogs generated by data catalog service 200. Such storage nodes (or other storage components of storage for data catalog(s) 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

Figure 4:
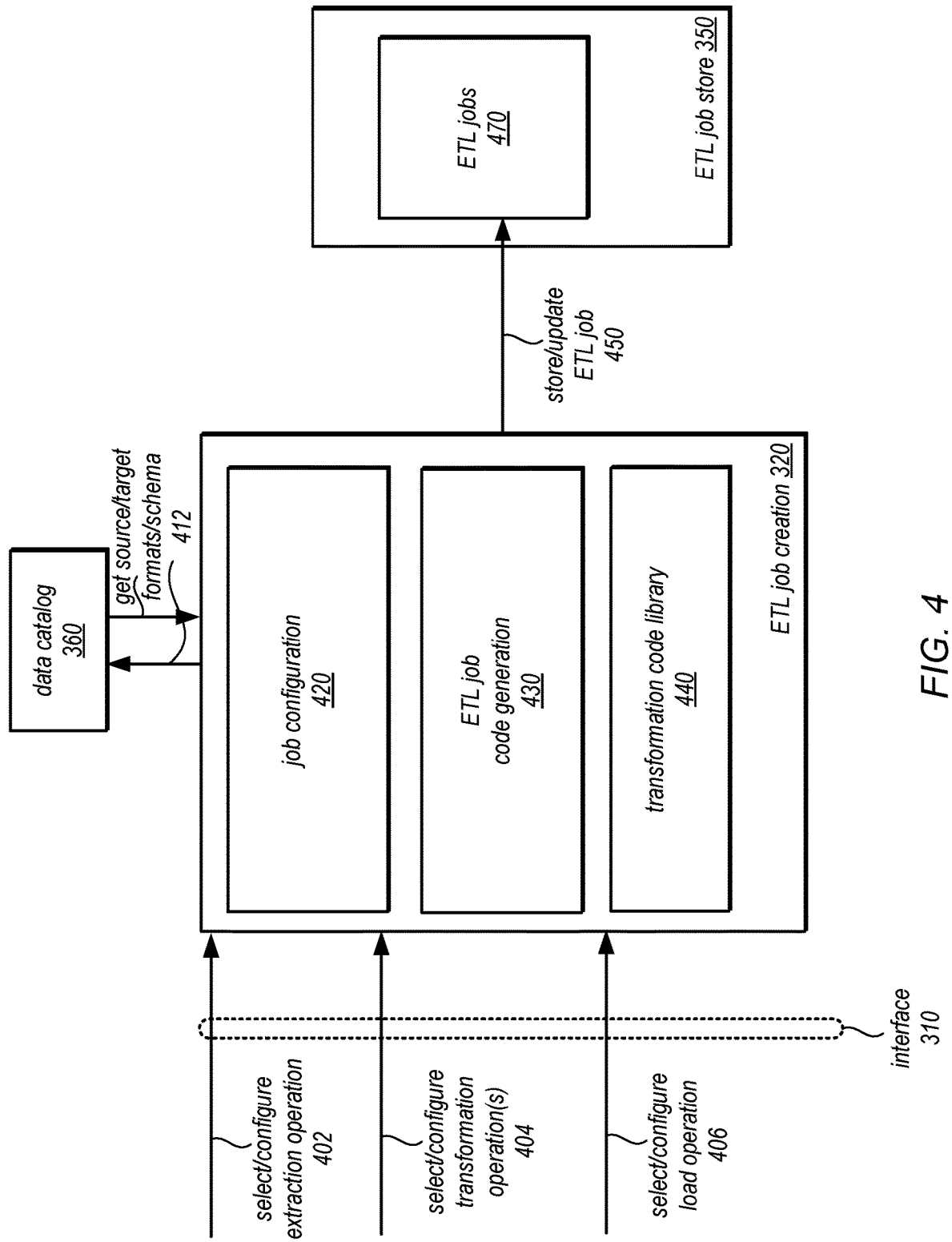
FIG. 4 is a logical block diagram illustrating ETL job creation, according to some embodiments.

FIG. 4 is a logical block diagram illustrating ETL job creation, according to some embodiments. ETL job creation 320 may handle various requests to create and configure ETL jobs performed by ETL service 220. For example, ETL job creation 320 may implement job configuration feature 420 to handle requests to create and configure ETL jobs. For example, job configuration 420 may implement a series of interactions via a GUI to guide a user through the configuration of an ETL job. For instance, job configuration 420 may solicit input that selects and configures an extraction operation 402 via interface 310. The selection and configuration of an extraction operation input 402 may include where source data for the ETL job is to be found (e.g., network address, storage location, file handle, object identifier, etc.), what format the source data is in (e.g., file format, encryption scheme, compression scheme, etc.), and how to access the data (e.g., identity tokens, credentials, passwords, etc.). In some embodiments, selection and configuration of an extraction operation input 402 may specify an ETL job platform (e.g., Apache Spark or other distributed processing platform) and/or hardware (e.g., X processing capacity, Y memory, and Z network bandwidth).

ETL job configuration 420 may handle requests or solicited input to select and configuration transformation operations 404. For instance, job configuration 420 may implement an interactive interface allowing users to visually connect transformation jobs of specified types to other transformation jobs and an extraction operation and load operation. Requests or solicited input to select and configure transformation operations 404 may include what transformation operation (e.g., machine learning pipeline, data mapping, data filtering, data splitting, data joining, storage format conversion, etc.), various operational parameters for performing the transformation operation (e.g., which columns to join into a single column), among other information for performing a transform data operation.

ETL job configuration 420 may handle requests or solicited input to select and configure load operations, in some embodiments. For example, requests or solicited input to select and configure load operations may indicate where source data for the ETL job is to be stored (e.g., network address, storage location, file handle, object identifier, etc.), and how to access the storage location (e.g., identity tokens, credentials, passwords, etc.).

ETL job code generation 430 may perform automated or manually specified via interface 310 ETL code generation for an ETL job. For example, ETL job code generation may get code for specific transformations (or workflows of multiple transformations) from transformation code library 440 and construct the source code for executing the transformations 456. For example, a summation transformation to add the values from multiple data fields into a single value may be generated according to a summation function or operation defined or specified by code library 440 or the code to implement machine learning transformation pipeline stages. In some embodiments operation configuration/selection requests may indicate a specified type of output source code (e.g., Python, Java, C#, etc.). ETL job code generation 430 may store 450 encoded ETL jobs 470 in ETL job store 350.

Figure 5:
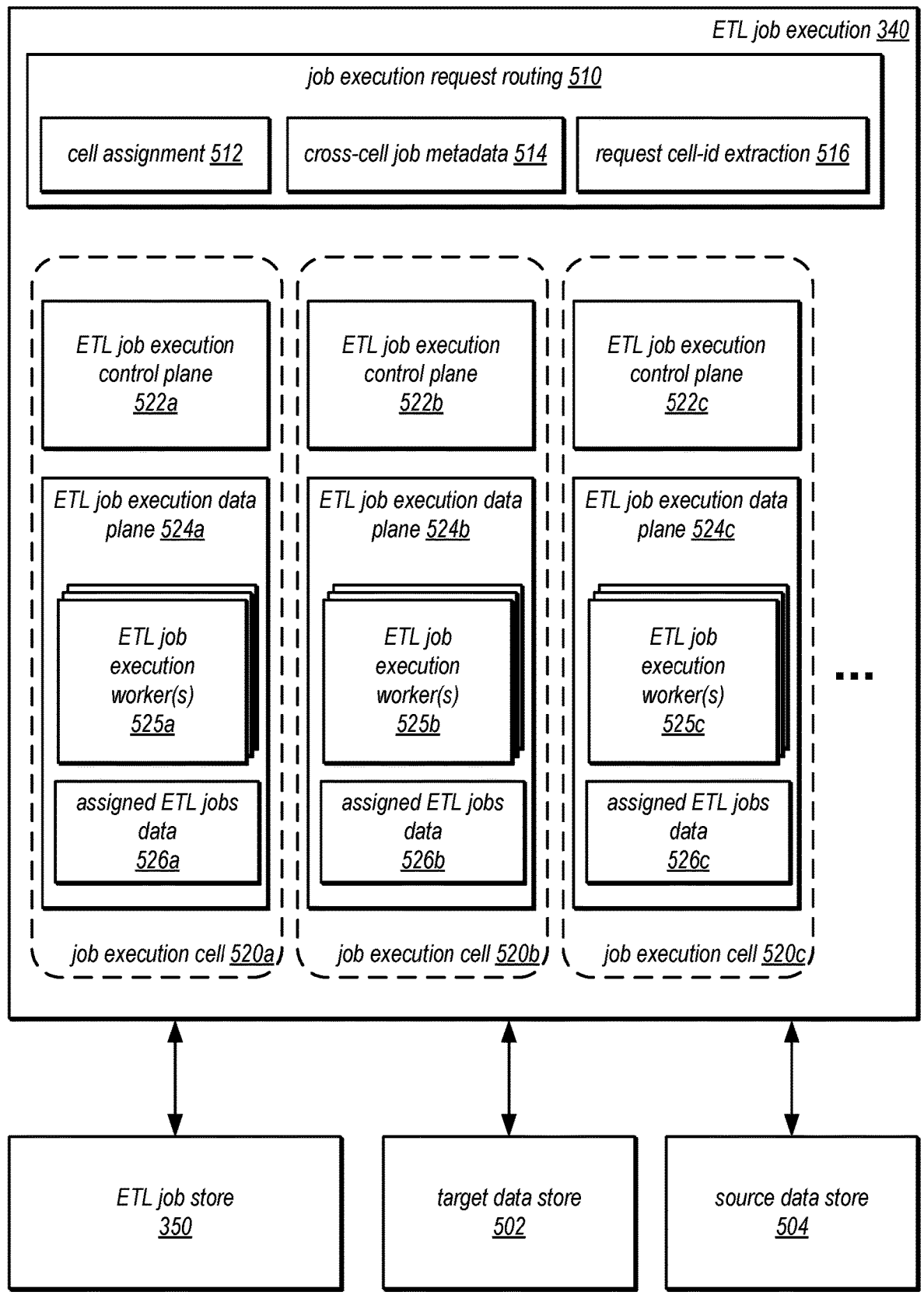
FIG. 5 is a logical block diagram illustrating job execution implemented as a cell-based architecture for an ETL service, according to some embodiments.

FIG. 5 is a logical block diagram illustrating job execution implemented as a cell-based architecture for an ETL service, according to some embodiments. ETL job execution 340 may be a subservice or micro-service of ETL service 210. ETL job service 340 may use a cell-based architecture that implements ETL job execution as independent replicas at respective job execution cells, 520a, 520b, 520c and so on. ETL job execution 340 may add or remove cells as needed using various configuration tasks or processes (not illustrated).

To interact with ETL job execution cells 520, ETL job execution 340 may implement a request routing subsystem or micro-service, using one or more multiple computing devices that can individually or collective perform job execution request routing 510. Job execution request routing 510 may include cell assignment techniques for requests to start a run of an ETL job, as indicated 512. As discussed in detail below with regard to FIG. 9, such techniques may Various selection techniques and factors may be considered when making a selection. For example, some selection techniques may be implemented to consider the current utilization or load on cells 520, factors in addition to or instead of workload, such as performance characteristics or requirements for an ETL job, and/or service-related conditions.

Other information may be maintained across cells, as indicated by cross-cell job metadata 514. While run-specific information for ETL jobs may be maintained within or by assigned cells (e.g., assigned ETL jobs data 526), some information may be maintained that can be used across runs of an ETL job and therefore may be used by multiple different cells (as different runs may be executed on different cells). Accordingly, cross-cell job metadata 514 may be a data store or cache of data stored elsewhere that is refreshed to include with requests that are routed to job execution cells 520a (e.g., security configuration information, bookmarks, or other data as discussed in detail below with regard to FIG. 9).

Once assigned, job execution request routing 510 may not have to retain or store the assignments between runs of an ETL job and the assigned cells. Rather the job execution cells 520 themselves may provide the cell identifiers that are then specified in subsequent requests. Accordingly, job execution request routing 510 may implement request cell-id extraction 516 to parse request to obtain the cell identifier and use locally maintained mapping information to identify the corresponding cell 520 using the cell identifier.

Job execution cells, such as job execution cells 520a, 520b, and 520c, may be implemented as part of ETL job execution 340. Each job execution cell may implement a respective job execution control plane, 522a, 522b, and 522c, and respective ETL job execution data plane, 524a, 524b, and 524c. ETL job execution control planes 522 may handle requests to perform tasks, including tasks to perform new tasks by determining whether the cell can accept a run of an ETL job, managing a warm pool of computing resources that can be used to implement ETL job execution worker(s), such as ETL job execution worker(s) 525*a*, 525*b*, and 525*c*, determining how many and assigning one (or more) job execution worker(s) 525 to a run of an ETL job, among other tasks.

ETL Job execution worker(s) 525 may get tasks to perform ETL jobs, including information (including executable code, invoked operations or transformations, and other information to execute the identified ETL job) from ETL job store 350 for the ETL job. ETL job execution worker(s) 525 may then perform the ETL job assigned to the cell in parallel or serialized fashion, in response to task requests, as discussed in detail below with regard to FIG. 6, which may include obtaining data from the source data store 504 (which may be a data storage service 210 of provider network 200). For example, ETL job execution worker(s) 252 may establish a connection to transfer data from source data store 504 and send one or more requests to obtain some or all of a source data object (e.g., via API requests for the source data store or via storage or transfer protocol, like secure file transfer protocol (SFTP) or an internet Small Computer Systems Interface (iSCSI)). Job execution worker(s) 525 may then apply the various transformation(s) or other operations specified by the ETL job to the obtained data.

Various transformations may be applied by ETL job execution worker(s) 525 and may include, but are not limited to, dropping one or more fields, values, or items from the source data object, converting data into a relational data format (e.g., converting lists, items or attributes, into row entries with respective column values), renaming a column, field, or attribute, selecting particular fields from the data object, or splitting fields into two different frames, locations, fields, or attributes, splitting rows, entries, or items into separate rows, entries, or items, unboxing or boxing data values, like strings, aggregating or combining data values, reducing the fidelity of data values by converting, rounding, truncating or modifying data values, or recognizing and generating custom data values (e.g., that combine values of multiple different types).

ETL job execution worker(s) 525 may establish a connection to store transformed data into target data store 502 (which may be the same or different as source data store 504) via API requests for target data store 502 or via storage or a transfer protocol, like SFTP or iSCSI. ETL job execution worker(s) 525 may also access and update an ETL job execution log in assigned ETL jobs data with job execution status and/or other performance information for a run of an ETL job. For example, ETL job execution workers may identify the progress of the ETL job (e.g., X rows out of Y total rows in a source table processed). In this way, failures of ETL job execution worker(s) 525 may be recovered from by access ETL job execution log to determine the last processed portion of a source data object. Errors and other events may be recorded for the ETL job in ETL job execution log, in some embodiments. ETL job execution worker(s) 525 may send responses indicating completion of task of the ETL job to ETL job orchestration 330, in some embodiments, which may be a trigger event or execution criteria for other ETL jobs.

Figure 6:
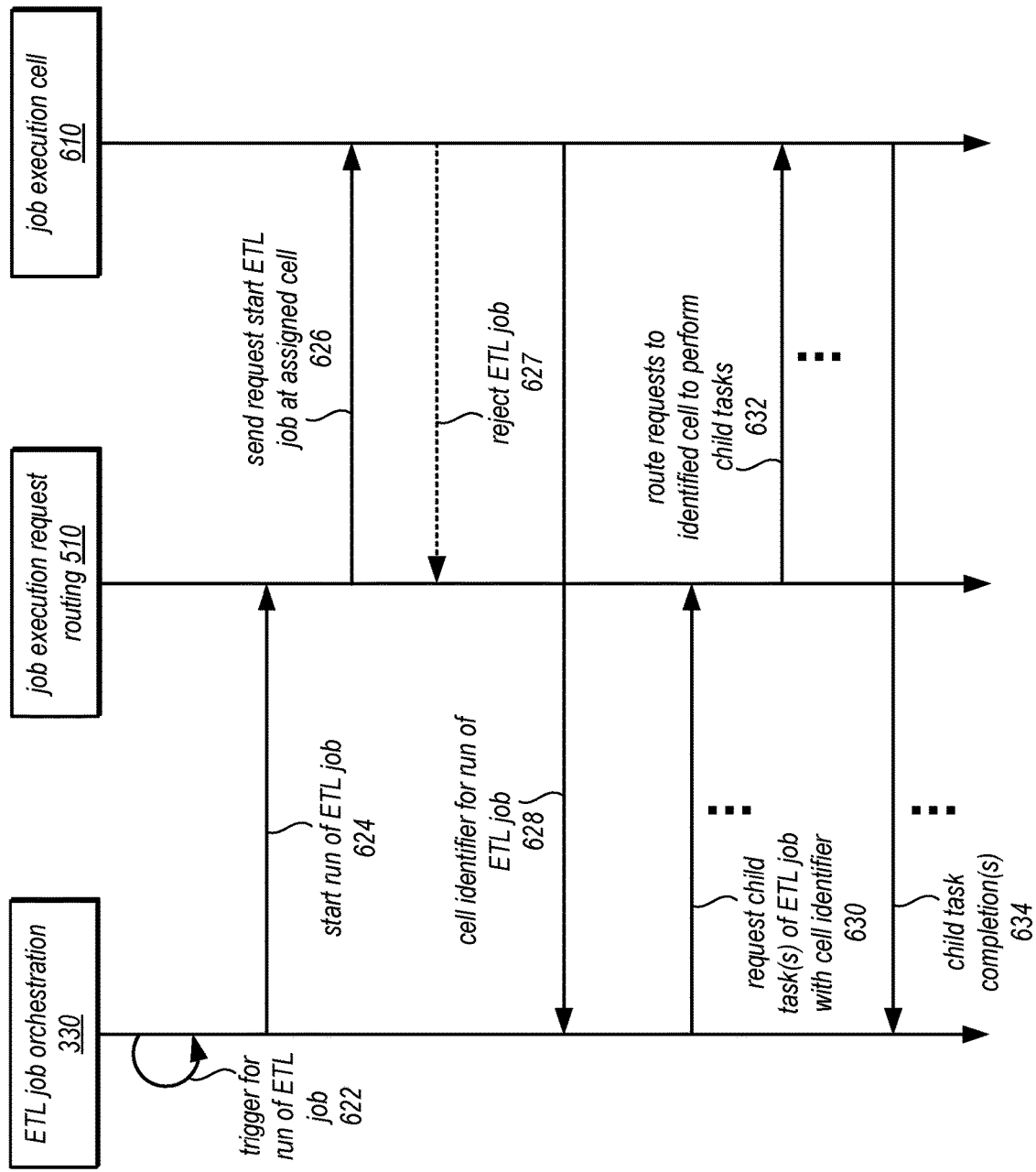
FIG. 6 is a logical block diagram illustrating interactions to assign and route tasks for runs of an ETL job, according to some embodiments.

FIG. 6 is a logical block diagram illustrating interactions to assign and route tasks for runs of an ETL job, according to some embodiments. As indicated at 622, ETL job orchestration 330 may detect a trigger for a run of an ETL job, according to the various triggers discussed above. Then, ETL job orchestration may send a request 624 to start a new run of the ETL job to job execution request routing 510. Job execution request routing 510 may determine that the request is a request to start a new run of an ETL job and thus may apply various selection techniques to make the assignment, as noted above with regard to FIG. 5 and discussed in detail below with regard to FIG. 9. Job execution request 510 may then send the request to start the run of the ETL job to the selected cell, job execution cell 610, as indicated at 626.

In some embodiments, a job execution cell, such as job execution cell 610 could reject the ETL job, as indicated at 627. Various cell analyses can be performed, as discussed in detail below with regard to FIG. 9. If rejected job execution request 510 may make another cell selection (which may be the same cell after waiting a retry period or another job execution cell).

If job execution cell 610 accepts the ETL job, then job execution cell 610 may perform the operation(s) associated with the parent task (e.g., extract operations from data source(s)) and append or otherwise include the cell identifier for the run of the ETL job returned in response, as indicated at 628. ETL job orchestration 330 may record the cell identifier as associated with the particular run of the ETL job (e.g., storing the cell identifier along with the job run identifier, both of which may be provided by job execution cell 610 at 628). Then, when subsequent child task(s) are requested by ETL job orchestration, as indicated 630, job execution request routing 510 can parse the request(s) to extract the cell identifier, access mapping information to lookup job execution cell 610, and route the requests to the identified cell, as indicated at 632. If completion responses are instructed, job execution cell 610 may provide them, as indicated at 634 for completed child task(s).

Figure 7:
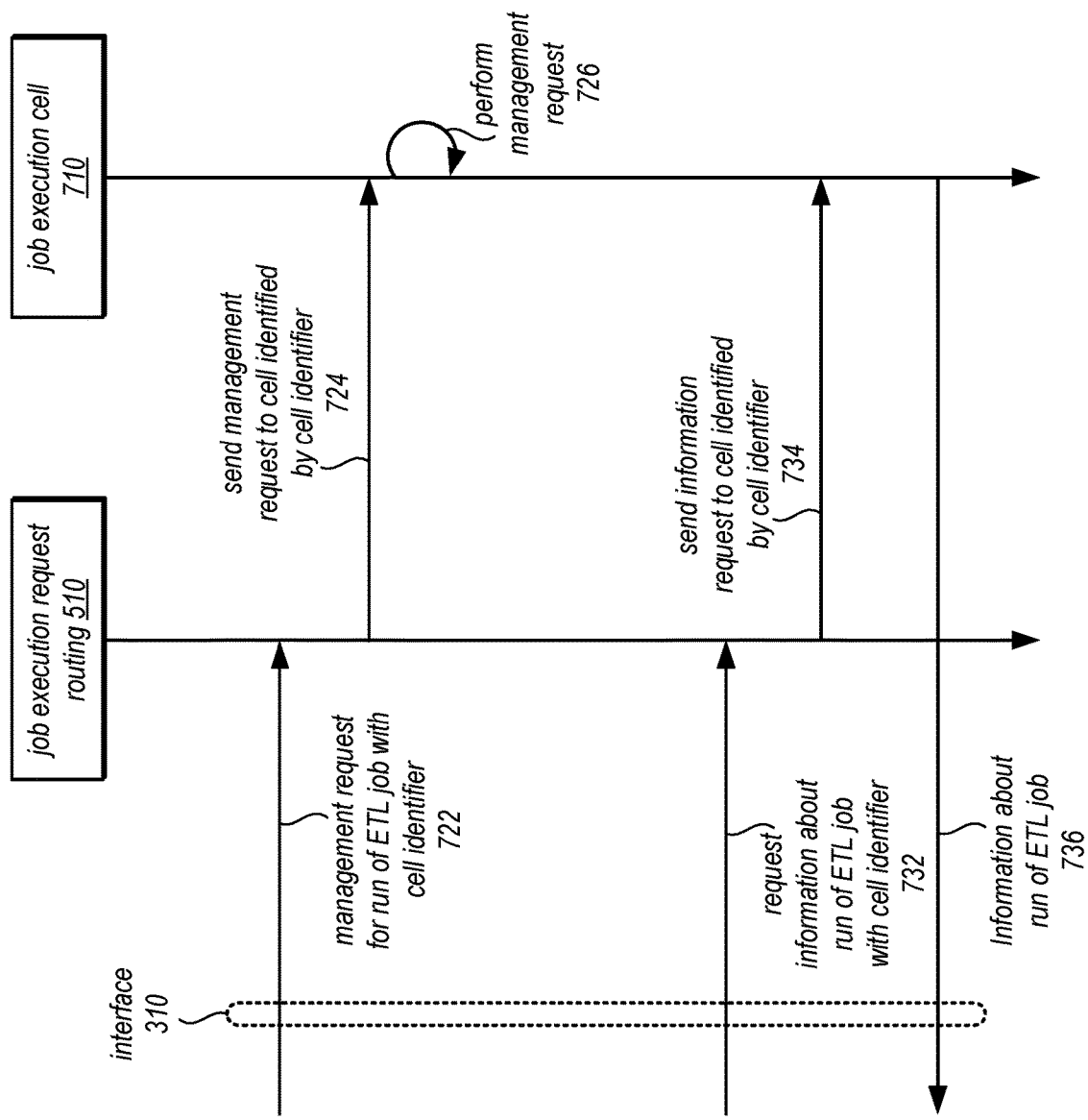
FIG. 7 is a logical block diagram illustrating interactions to route management and information requests for runs of an ETL job, according to some embodiments.

Other requests, in addition to requests to perform tasks of a computational job, may make use of a cell identifier in order to access or interact with an assigned cell without job execution request routing having to store the mapping. For example, because the cell identifier may be appended to a value of another field specified in a request, this may allow a client that submits the request to the request router to be unaware of the cell identifier and the specific cell which is performing the request, in some embodiments. FIG. 7 is a logical block diagram illustrating interactions to route management and information requests for runs of an ETL job, according to some embodiments. As indicated at 722, interface 310 may support various management requests for a particular run of an ETL job. These requests may include requests to pause, stop, delete, or restart, an ETL job at the assigned cell. Specified within the request may be the cell identifier provided by the cell when the run of the ETL job was begun at the cell (as discussed above with regard to FIG. 6).

As illustrated in FIG. 7, job execution request routing 510 may parse the request to extract the cell identifier, access mapping information to lookup job execution cell 710, and send the management request to job execution cell 710 according to the cell identifier, as indicated at 724. Job execution cell 710 may then perform the management action, as indicated at 726.

As indicated at 732, interface 310 may support various requests to obtain information about a particular run of an ETL job. These requests may include requests to obtain particular performance information, log records, or various other information descriptive of an ETL job at the assigned cell. Specified within the request may be the cell identifier provided by the cell when the run of the ETL job was begun at the cell (as discussed above with regard to FIG. 6).

As illustrated in FIG. 7, job execution request routing 510 may parse the request to extract the cell identifier, access mapping information to lookup job execution cell 710, and send the management request to job execution cell 710 according to the cell identifier, as indicated at 734. Job execution cell 710 may then obtain the requested information and return the information in response, as indicated at 736.

Although FIGS. 2-7 have been described and illustrated in the context of an ETL service, the various techniques and components illustrated and described in FIGS. 2-7 may be easily applied to other network-based services that implement a cell-based architecture to perform computational jobs. As such, FIGS. 2-7 are not intended to be limiting as to other embodiments of a system that may implement routing child tasks of computational jobs to cells of a network-based service.

FIG. 8 is a high-level flowchart illustrating various methods and techniques to implement routing child tasks of computational jobs to cells of a network-based service, according to some embodiments. Various different systems and devices may implement the various methods and techniques described below, either singly or working together. For example, an ETL service such as described above with regard to FIGS. 2-7 may be configured to implement the various methods. Alternatively, a combination of different systems and devices may implement the techniques below. Therefore, the above examples and or any other systems or devices referenced as performing the illustrated method, are not intended to be limiting as to other different components, modules, systems, or configurations of systems and devices.

As indicated at 810, a request to perform a child task of a computational job may be received at a request router of a network-based service. A request router, as discussed in detail above with regard to FIG. 1, may be a single request router or one of many request routers that work to implement request routing (e.g., a front-end) for a network-based service. The request router may support requests formatted in various ways (e.g., according to APIs). The request router may, in some embodiments, be assigned to handle requests received at a particular network endpoint for a region or other location of the network-based service (with other request routers handling requests directed to other network endpoints or associated with other regions/locations of the network-based service. The request may be associated with (e.g., by an job run identifier specified in the request) with a computational job. As discussed above with regard to FIG. 1, computational jobs may include a parent tasks and one (or more) child tasks to complete a run of the computational job, in some embodiments.

As indicated at 820, the request router may parse the request to extract a cell identifier for the run of the computational job included in the request, in some embodiments. For example, the cell identifier may be appended to a value of another field specified in the request (e.g., the job run identifier) or may be specified in a separate field or other dedicated/reserved location in the request. Because the cell identifier is appended to a value of another field specified in the request, this may allow a client that submits the request to the request router to be unaware of the cell identifier and the specific cell which is performing the request, in some embodiments. Parsing the request may include implementing a byte or other character parser that can interpret character codes or other data values in range of data in the request to produce the cell identifier.

As discussed above with regard to FIGS. 1 and 5-7, the network-based service may implement multiple cells as part of a cell-based architecture for the network-based service to execute runs of computational jobs at the network-based service, in various embodiments. The cells may respectively include computing resources (e.g., servers, virtual machines, containers, or other computing instances) that implement independent replicas of the network-based service to perform tasks sent by the request router, in some embodiments. As discussed above with regard to FIG. 5, these cells may implement multiple service functions, such as a control plane that manages resources and directs performance of those resources, and a data plane, which may access and operate upon data to perform tasks. Cells may be isolated from communicating with each other so that no cell can communicate with any other cell, in some embodiments. As discussed above with regard to FIG. 1 and FIG. 6, the cell identifier may have been previously provided to a client of the network-based service as part performing of the parent task of the run of the computational job at a cell of the network-based service assigned the run of the computational job.

As indicated at 830, the cell of the network-based services may be identified by the request router according to a mapping between the cell and the cell identifier, the cells being mapped to different cell identifiers, in some embodiments. For example a table or other index structure can use the cell identifier value as a lookup key to locate the mapped cell (which may have a network location stored for routing the request). As indicated at 840, the request may be sent by the request router to the identified cell to perform the child task of the run of the computational job, according to some embodiments. In some embodiments, the cell may send an acknowledgement directly to the client (e.g., when the child task completes) or may record status (e.g., completion) in a location that can be accessed by the client which can allow the client determine if any subsequent child tasks remained to be performed for the computational job.

Figure 9:
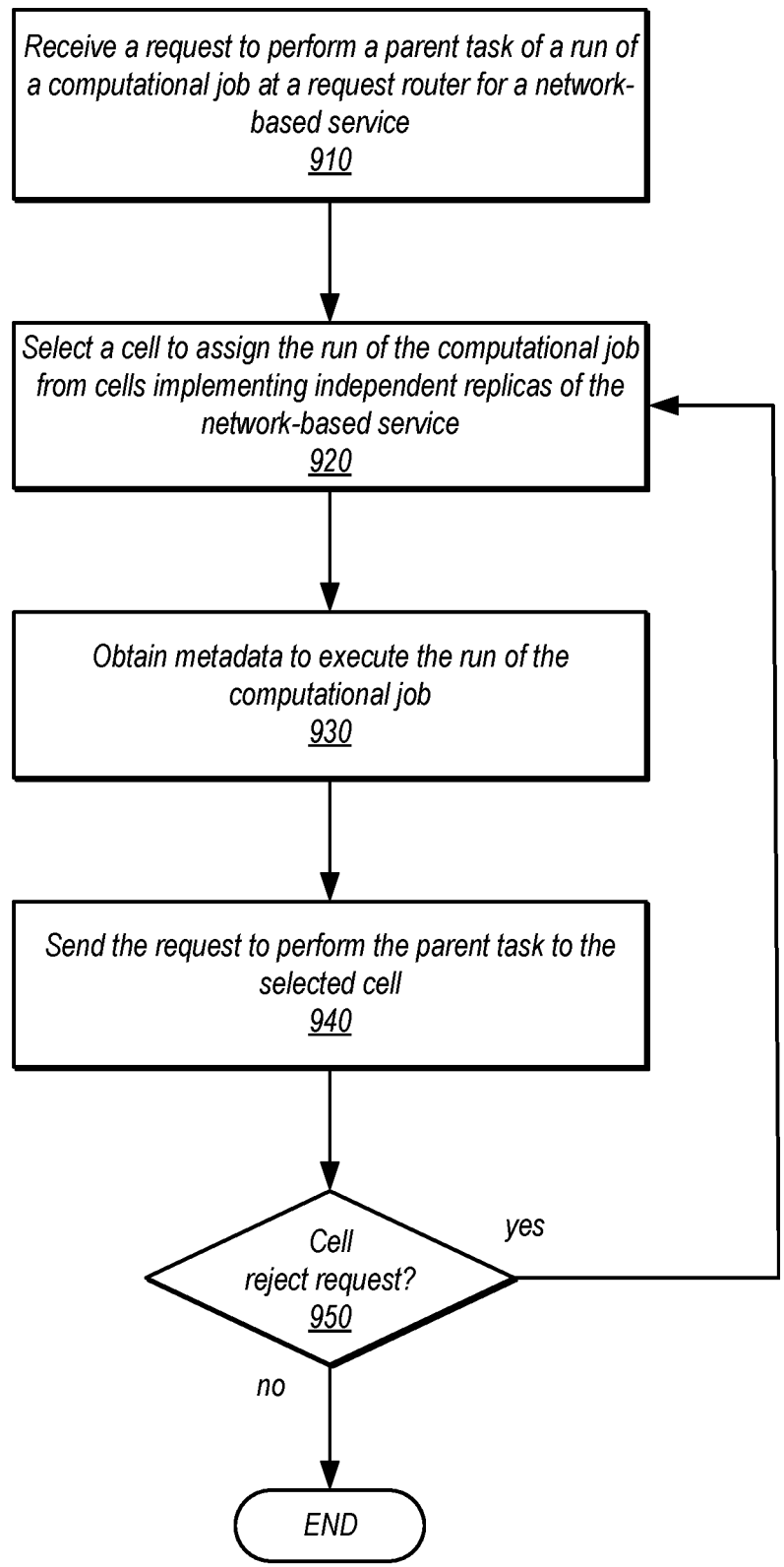
FIG. 9 is a high-level flowchart illustrating various methods and techniques to implement assigning runs of computational jobs to cells of a network-based service, according to some embodiments.

Assignment of cells of a network-based service to runs of a computational job may allow for many different performance improvements to be achieved for the network-based service and clients of the network-based service. FIG. 9 is a high-level flowchart illustrating various methods and techniques to implement assigning runs of computational jobs to cells of a network-based service, according to some embodiments. As indicated at 910, a request to perform a parent task of a run of a computational job may be received at a request router for a network-based service, in some embodiments. The request may be submitted via an interface (e.g., API) that allows for a new run of a previously defined computational job to be performed, in some embodiments (e.g., the computational job was already defined and stored as discussed above with regard to FIG. 4). In other embodiments, the computational job can be defined or specified in the request (e.g., via a payload of job tasks or other information to access a job definition).

As indicated at 920, a cell may be selected to assign the run of the computational job from cells implementing independent replicas of the network-based service, in some embodiments. Various selection techniques and factors may be considered when making a selection. For example, some selection techniques may be implemented to consider the current utilization or load on the cells to select a "least loaded" or underutilized cell. In some embodiments, an estimate of the work to perform the computational job may be used to determine whether available capacity of a cell fits the computational job. In some embodiments, information may be collected from (or automatically reported by) the cells to make the selection. In some embodiments, distribution schemes, such as consistent hashing (e.g., which maps different ranges of hash values to different cells located at multiple, different locations of a ring of hash values (e.g., where the highest possible hash value connects to the lowest possible hash value). In this way, the distributions scheme can balance workload across multiple cells as well as making backup selections if a single cell is unavailable or rejects the request (as noted above), because a next cell on the ring of hash values could alternatively be used if the first selected cell cannot. Other hashing techniques or other distribution schemes, such as random distribution, may be implemented.

Other factors in addition to or instead of workload may be considered by the request router for the network-based service. For instance, performance characteristics or requirements for a computational job, such as isolation from other client workloads, may use a pinned cell, that is always assigned runs of a computational job, may be implemented. Pinning of runs of a computational jobs with a same account may be performed for various reasons, including a determination that a particular cell has the appropriate capacity or arrangement of computing resources to perform the computational job. Another factor may be service-related conditions (e.g., to reduce exposure of clients or jobs to possible failure conditions by locating them in specific cells (which may have different locations or other failure characteristics, such as different availability zones as discussed above). Unless pinning is performed, assignment of a run of a computational job to a cell may lead to scenarios where different runs of the same job are executed on different cells, as well as runs of different computational jobs are executed concurrently on the same cell.

As indicated at 930, metadata to execute the run of the computational job may be obtained, in some embodiments. For example, this metadata may be cross-cell state for computational jobs that is "stateful" and can be changed, but is not mutable for a particular run of a computational job. For example, security configuration information (e.g., encryption keys or credential) or tracking information (e.g., job bookmarks) may be maintained and reused across runs of a jobs. This may be stored locally at a request router or requested by the request router when needed, in some embodiments.

As indicated at 940, the request to perform the parent task may be sent to the selected cell, in some embodiments. The obtained metadata may inform or be included in the request, in some embodiments. The request may be a request to start or create a new run of a task at the cell, in some embodiments. The request may include an identifier for the computational job to obtain the job definition, or at least the parent task, (or the parent task definition itself).

As indicated at 950, a cell may accept or reject the request, in some embodiments. For example, a cell may maintain or monitor its own health metrics, using utilization, latency, or other performance measurements of computing resources, including the performance of ongoing tasks for computational jobs, to determine whether the cell can accept the request. In some embodiments, resource requirements for performing the run of the computational job may be determined (or estimated) based on the computational job definition (e.g., how many tasks, what each task involves, etc.). For example, a cluster or other number of compute instances may be determined for the computational job and compared with the a number of available compute instances in a warm pool of available compute instances maintained in the cell).

These various types of evaluations may cause, in the event the cell determines that it is not able to accept the request, a response to reject the request, as indicated by the positive exit from 950. The request router may apply a same selection technique to determine an alternative cell (e.g., the next cell on the ring for consistent hashing) or a different selection technique (e.g., using a designated backup cell). In some embodiments, no other cell may be available so a waiting period may be implemented before attempting to retry the cell. In some embodiments, a number of a retries may be permitted for the cell (and/or other cells) before a failure of the run of the computational job is determined. A subsequently selected cell may be able to reject the request, or in some embodiments, the cell may be notified that the cell cannot refuse the request (e.g., if the run of the computational job has been pending for at least a period of time).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
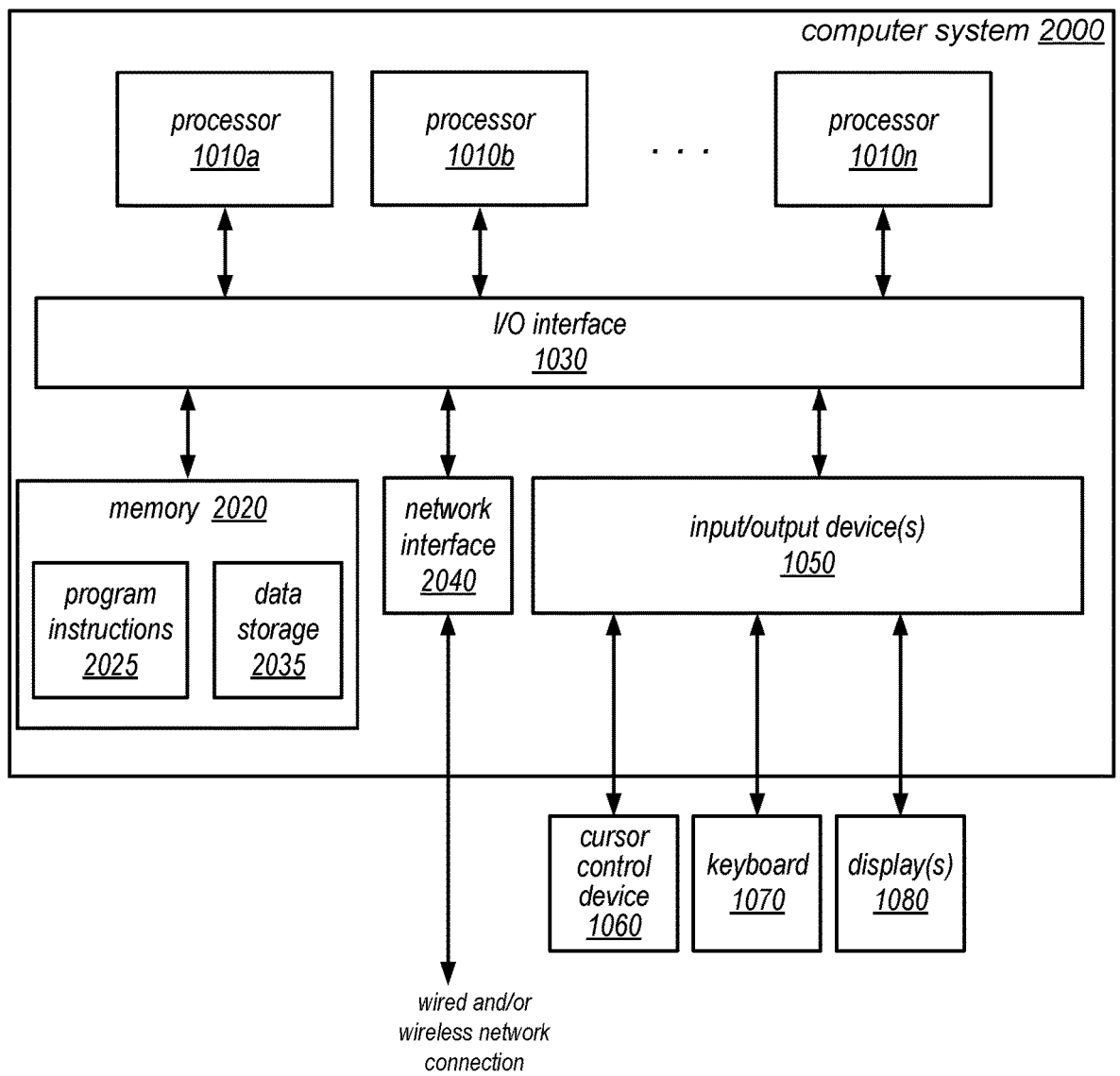
FIG. 10 illustrates an example system configured to implement the various methods, techniques, and systems described herein, according to some embodiments.

Embodiments of routing child tasks of computational jobs to cells of a network-based service as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a plurality of computing devices, respectively comprising at least one processor and a memory, wherein the plurality of a computing devices implement a job execution service for an Extract Transform and Load (ETL) service offered by a provider network, wherein the job execution service comprises:
    a request router;
    a plurality of cells as part of a cell-based architecture for the job execution service to execute runs of ETL jobs at the job execution service, wherein the plurality of cells respectively comprise computing resources that implement independent replicas of the job execution service to perform tasks sent by the request router, wherein individual ones of the plurality of cells are isolated from communicating with other ones of the plurality of cells;
    wherein the request router is configured to:
        receive a request to perform a child task of an ETL job, wherein the ETL job comprises a parent task and one or more child tasks to complete a run of the ETL job;
        parse the request to extract a cell identifier for the run of the ETL job included in the request, wherein the cell identifier was previously provided as part performing of the parent task by a cell of the plurality of cells of the job execution service assigned the run of the computational job;
        perform a lookup in mapping information between the individual ones of the plurality of cells are to different cell identifiers to identify the cell of the plurality of cells according to the extracted cell identifier; and
        send the request to the identified cell to perform the child task of the run of the ETL job.

2. The system of claim 1, wherein the request router is further configured to:
    receive a request to perform the parent task of the run of the computational job;
    select the cell to assign the run of the computational job; and
    send the request to perform the parent task to the cell.

3. The system of claim 2, wherein a previously selected cell of the plurality of cells rejected the run of the computational job before the cell was selected to assign the run of the computational job.

4. The system of claim 2, wherein the request router is further configured to obtain metadata to execute the run of the computational job at the request router, wherein the request to perform the parent task includes at least some of the obtained metadata.

5. A method, comprising:
    receiving, at a request router for a network-based service, a request to perform a child task of a computational job, wherein the computational job comprises a parent task and one or more child tasks to complete a run of the computational job;

parsing, by the request router, the request to extract a cell identifier for the run of the computational job included in the request, wherein the network-based service implements a plurality of cells as part of a cell-based architecture for the network-based service to execute runs of computational jobs at the network-based service, wherein the plurality of cells respectively comprise computing resources that implement independent replicas of the network-based service to perform tasks sent by the request router, wherein individual ones of the plurality of cells are isolated from communicating with other ones of the plurality of cells, and wherein the cell identifier was previously provided as part performing of the parent task by a cell of the plurality of cells of the network-based service assigned the run of the computational job;

identifying, by the request router, the cell of the plurality of cells of the network-based service according to a mapping between the cell and the cell identifier, wherein the individual ones of the plurality of cells are mapped to different cell identifiers; and sending, by the request router, the request to the identified cell to perform the child task of the run of the computational job.

6. The method of claim 5, further comprising:
   receiving, by the request router, a request to perform the parent task of the run of the computational job;
   selecting, by the request router, the cell to assign the run of the computational job; and
   sending, by the request router, the request to perform the parent task to the cell.

7. The method of claim 6, wherein the selection of the cell is based on a workload distribution scheme.

8. The method of claim 6, wherein a previously selected cell of the plurality of cells rejected the run of the computational job before the cell was selected to assign the run of the computational job.

9. The method of claim 6, wherein the selection is performed according to the cell having been pinned for executing the computational job.

10. The method of claim 6, further comprising obtaining metadata to execute the run of the computational job at the request router, wherein the request to perform the parent task includes at least some of the obtained metadata.

11. The method of claim 5, further comprising:
    receiving, by the request router, a request to perform a management operation with respect to the run of the computational job, wherein the request specifies the cell identifier of the cell;
    parsing, by the request router, the request to perform the management operation to extract the cell identifier included in the request for the information;
    identifying, by the request router, the cell of the plurality of cells of the network-based service according to the mapping between the cell and the cell identifier; and
    sending, by the request router, the request to perform the management operation to the cell of the network-based service, wherein the cell performs the requested management operation.

12. The method of claim 5, wherein a different run of the computational job is assigned to a different cell of the plurality of cells of the network-based service.

13. The method of claim 5, wherein the computational job is an Extract Transform and Load (ETL) job, and wherein the network-based service is an ETL service offered by a provider network.

14. One or more non-transitory, computer-readable storage media, storing program instructions that when executed on or across one or more computing devices cause the one or more computing devices to implement a request router for a network-based service that implements:
    receiving a request to perform a child task of a computational job, wherein the computational job comprises a parent task and one or more child tasks to complete a run of the computational job;
    parsing the request to extract a cell identifier for the run of the computational job included in the request, wherein the network-based service implements a plurality of cells as part of a cell-based architecture for the network-based service to execute runs of computational jobs at the network-based service, wherein the plurality of cells respectively comprise computing resources that implement independent replicas of the network-based service to perform tasks sent by the request router, wherein individual ones of the plurality of cells are isolated from communicating with other ones of the plurality of cells, and wherein the cell identifier was previously provided as part performing of the parent task by a cell of the plurality of cells of the network-based service assigned the run of the computational job;
    performing a lookup in mapping information between the individual ones of the plurality of cells are to different cell identifiers to identify the cell of the plurality of cells according to the extracted cell identifier; and
    sending the request to the identified cell to perform the child task of the run of the computational job.

15. The one or more non-transitory, computer-readable storage media of claim 14, storing further programming instructions that when executed on or across the one or more computing devices that cause the request router to further implement:
    receiving a request to perform the parent task of the run of the computational job;
    selecting the cell to assign the run of the computational job; and
    sending the request to perform the parent task to the cell.

16. The one or more non-transitory, computer-readable storage media of claim 15, wherein the selection of the cell is based on a consistent hashing scheme.

17. The one or more non-transitory, computer-readable storage media of claim 15, wherein a previously selected cell of the plurality of cells rejected the run of the computational job before the cell was selected to assign the run of the computational job.

18. The one or more non-transitory, computer-readable storage media of claim 15, storing further programming instructions that when executed on or across the one or more computing devices that cause the request router to further implement obtaining metadata to execute the run of the computational job at the request router, wherein the request to perform the parent task includes at least some of the obtained metadata.

19. The one or more non-transitory, computer-readable storage media of claim 14, storing further programming instructions that when executed on or across the one or more computing devices that cause the request router to further implement:

receiving a request for information about the run of the computational job, wherein the request specifies the cell identifier of the cell;

parsing the request for the information to extract the cell identifier included in the request for the information;

identifying the cell of the plurality of cells of the network-based service according to the mapping between the cell and the cell identifier; and sending the request for the information to the cell of the network-based service, wherein the cell returns the requested information.

20. The one or more non-transitory, computer-readable storage media of claim 14, wherein a different run of a different computational job is assigned to the cell of the plurality of cells of the network-based service.

* * * * *